(12) United States Patent
Puthenpura et al.

(10) Patent No.: US 8,913,497 B2
(45) Date of Patent: Dec. 16, 2014

(54) METHOD AND APPARATUS FOR PLANNING SERVING GENERAL PACKET RADIO SERVICE SUPPORT NODES IN A WIRELESS NETWORK

(75) Inventors: Sarat Puthenpura, Berkeley Heights, NJ (US); David G. Belanger, Hillsborough, NJ (US); Arun Jotshi, Parsippany, NJ (US); Sam Houston Parker, Cranbury, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 619 days.

(21) Appl. No.: 12/959,269

(22) Filed: Dec. 2, 2010

(65) Prior Publication Data

US 2012/0140627 A1 Jun. 7, 2012

(51) Int. Cl.
*H04L 12/28* (2006.01)
*H04W 4/00* (2009.01)
*H04W 72/00* (2009.01)
*H04W 16/18* (2009.01)
*H04L 12/24* (2006.01)
*H04W 84/04* (2009.01)

(52) U.S. Cl.
CPC ............. *H04L 41/145* (2013.01); *H04W 16/18* (2013.01); *H04W 84/042* (2013.01)

USPC .......... 370/235; 370/329; 370/254; 455/453; 455/452.1

(58) Field of Classification Search
None
See application file for complete search history.

(56) References Cited

U.S. PATENT DOCUMENTS

| 6,845,095 | B2 * | 1/2005 | Krishnarajah et al. ........ 370/349 |
|---|---|---|---|
| 6,973,311 | B2 * | 12/2005 | Yi-Bing et al. ............... 455/436 |
| 7,457,270 | B2 * | 11/2008 | Tsao .............................. 370/338 |
| 2007/0213058 | A1 * | 9/2007 | Shaheen ....................... 455/436 |
| 2010/0002582 | A1 * | 1/2010 | Luft et al. .................. 370/230.1 |
| 2010/0017247 | A1 * | 1/2010 | Liu et al. ........................... 705/8 |
| 2010/0173631 | A1 * | 7/2010 | Kim et al. ..................... 455/436 |

* cited by examiner

*Primary Examiner* — Yemane Mesfin
*Assistant Examiner* — Peter Chen (57) ABSTRACT

A method and apparatus for providing planning of a plurality of serving general packet radio service support nodes in a wireless network are disclosed. For example, the method obtains input data, and determines a limit for at least one serving general packet radio service support node parameter in accordance with the input data. The method determines if the limit for the at least one serving general packet radio service support node parameter is exceeded and determines an optimal output for an objective function, wherein the objective function is based on a plurality of penalty factors, if the limit for the at least one serving general packet radio service support node parameter is exceeded.

14 Claims, 4 Drawing Sheets

METHOD AND APPARATUS FOR PLANNING SERVING GENERAL PACKET RADIO SERVICE SUPPORT NODES IN A WIRELESS NETWORK

The present disclosure relates generally to communication networks and, more particularly, to a method and apparatus for planning serving general packet radio service support nodes in a wireless network, e.g., a cellular network.

BACKGROUND

As Internet usage continues to grow, more and more customers are accessing communications services via a mobile device, e.g., a cell phone, a smart phone, etc. For example, a customer may receive multimedia content via his/her cell phone. The cell phone transmits and receives voice and data packets to and from the service provider's network via a base station and an access network.

The customer's ability to access services via a mobile device is dependent on the availability of capacity on various network elements, e.g., base station subsystems, radio access networks, cell site equipment, core network nodes responsible for communicating with user endpoint devices via the base station subsystems or radio access networks, and so on. The service provider then needs to perform capacity planning and manage the performance of the network. However, capacity planning requires consideration of many factors such as load balancing, capital cost, etc. One approach for planning capacity is manually manipulating parameters associated with each relevant factor until an experienced planner deems the result satisfactory. Unfortunately, this manual approach is labor intensive and highly non-optimal for capacity planning of large networks.

SUMMARY OF THE DISCLOSURE

In one embodiment, the present disclosure describes a method and apparatus for providing planning of a plurality of serving general packet radio service support nodes in a wireless network. For example, the method obtains input data, and determines a limit for at least one serving general packet radio service support node parameter in accordance with the input data. The method determines if the limit for the at least one serving general packet radio service support node parameter is exceeded and determines an optimal output for an objective function, wherein the objective function is based on a plurality of penalty factors, if the limit for the at least one serving general packet radio service support node parameter is exceeded.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for planning serving general packet radio service support nodes in a wireless network, e.g., a cellular network. Although the teachings of the present disclosure are discussed below in the context of a wireless network, the teaching is not so limited. Namely, the teachings of the present disclosure can be applied for other types of networks, wherein the planning of capacity requires simultaneous consideration of multiple factors.

Figure 1:
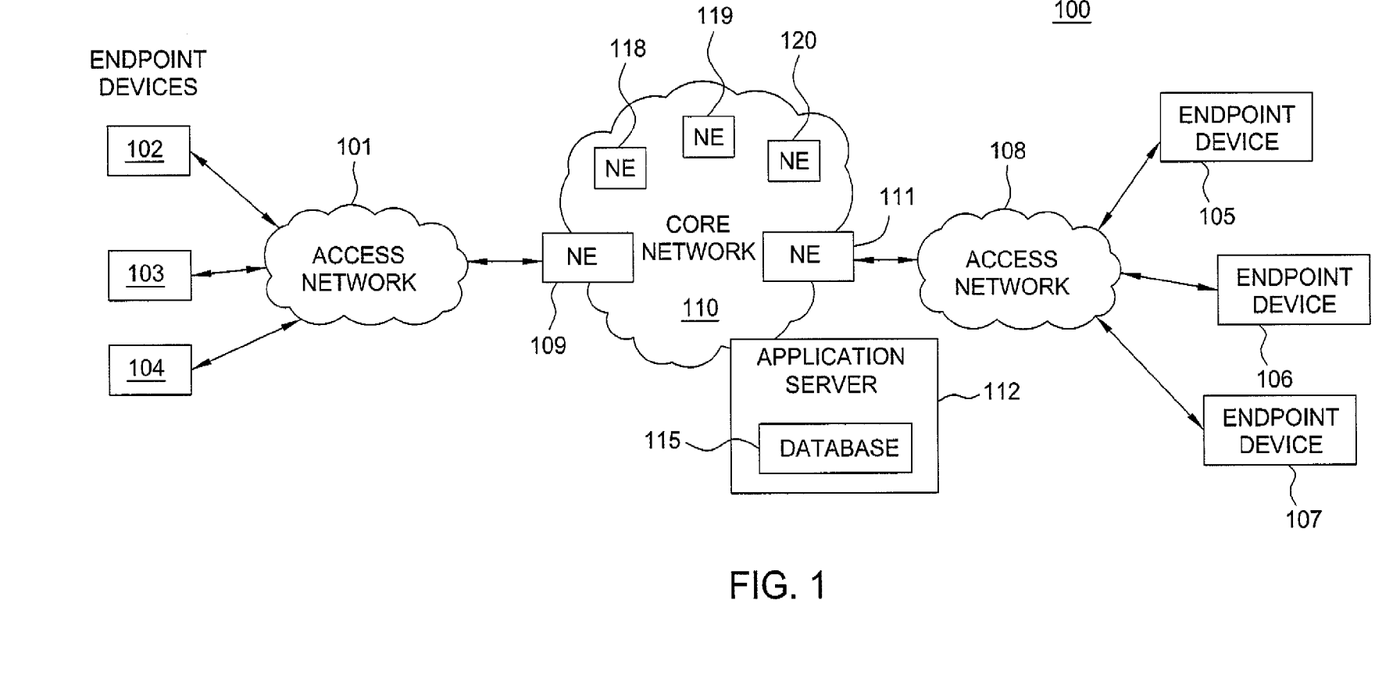
FIG. 1 is a block diagram depicting an illustrative network related to the current disclosure.

FIG. 1 is a block diagram depicting an illustrative network 100 related to the current disclosure. Illustrative networks may include Internet protocol (IP) networks, IP Multimedia Subsystem (IMS) networks, Ethernet networks, wireless networks and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a Base Station Subsystem (BSS), a $3^{rd}$ party network, a cellular network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g., voice and data services, are transmitted on networks.

In one embodiment, a service provider may enable customers to access services via a wireless access network, e.g. a base station subsystem or a radio access network. For example, a customer may use a cell phone or a smart phone to access Internet Protocol (IP) services, multimedia services, and the like. The packets from and to the wireless device, e.g., cell phone, may then traverse one or more base station subsystems, radio access networks and network equipment, e.g., base stations, backhaul equipment, etc. A base station for a 2G network is also referred to as a base transceiver station. A base station in a 3G network is also referred to as Node B. It should be noted base stations in accordance with other network protocols or standards are within the scope of the present disclosure.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The exemplary base station may also be referred to as a three sector base station.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized.

In one embodiment, each base station in a 3G wireless network is controlled by a radio network controller (RNC). However, the 3G wireless network may have a plurality of radio network controllers. For each base station, a specific radio network controller is then selected from among the plurality of radio network controllers. The assigning of a base station to a specific radio network controller may also be referred to as homing the base station to a radio network controller. For example, a specific base station "A" may be homed to a specific radio network controller "X." The specific radio network controller X is then responsible for controlling the traffic traversing through the base station A. If at a later time period, another radio network controller Y is selected to control the traffic traversing through the base station A, the base station A is said to be re-homed to the radio network controller Y.

Similarly, in one embodiment, each base station in a 2G wireless network is controlled by a base station controller (BSC). The 2G wireless network may have a plurality of base station controllers. Each of the base station subsystems may comprise a plurality of base station controllers. For each base transceiver station, a specific base station controller is then selected from among the plurality of base station controllers. The assigning of a base transceiver station to a specific base station controller may be referred to as homing the base station to a base station controller.

The radio network controllers and base station controllers route calls from user endpoint devices towards their destination via the service provider's core network. Similarly, calls destined to the user endpoint devices traverse the core network to reach either a radio network controller (for 3G) or a base station controller (for 2G). As applicable, the radio network controller or the base station controller forwards the calls towards their intended user endpoint device.

However, calls to and from the wireless networks (2G and 3G) are routed through the core network based on the type of call. For example, voice calls and data calls (broadly data sessions) are routed via different types of network nodes. Consequently, the amount of voice calls supported by the wireless network may affect the types of network nodes that support voice calls. Similarly, the amount of data calls may affect the types of network nodes used to support data calls. In order to clearly illustrate the impact of voice and data traffic on the core network, the following network terminologies are first provided:

General packet radio service (GPRS);
Serving GPRS support node (SGSN);
Gateway GPRS support node (GGSN);
Mobile Switching Center (MSC);
Gateway mobile switching center (GMSC);
Gb interface;
IuB interface;
IuR interface;
IuCS interface;
IuPS interface; and
Signaling System 7 (SS7) Signaling Transport (SIGTRAN).

In one embodiment, a General Packet Radio Service (GPRS) refers to a communications service used to transfer data via a cellular network. GPRS is available to users of a 2G cellular system GSM (global system for mobile communication). The GPRS provides an enhancement to the GSM system so that data packets are supported.

In one embodiment, a Serving GPRS Support Node (SGSN) refers to a network node responsible for communicating with user endpoint devices and routing of data calls. For example, the SGSN may send and receive data packets to and from user endpoint devices in the coverage area of the SGSN.

In one embodiment, a Gateway GPRS Support Node (GGSN) refers to a network node responsible for the interworking between the GPRS network and external packet switched networks, e.g. the internet. The GGSN converts the GPRS packets coming from the SGSN into the packet data protocol (PDP) format of the external packet network. For example, the GPRS packet may be converted to an Internet protocol packet prior to being sent to the external network, which is internet protocol based.

In one embodiment, a Mobile Switching Center (MSC) refers to a network node that is responsible for communicating with user endpoint devices, routing voice calls and providing other services. For example, the MSC may setup and release end-to-end connections and perform handover during a call to handle mobility of user endpoint devices.

In one embodiment, a Gateway mobile switching center (GMSC) refers to a network node that determines which mobile switching center (MSC) is currently being visited by a called party.

In one embodiment, a Gb interface refers to an interface between a base station subsystem and an SGSN. The transmission protocol of the Gb interface may be based on a packet protocol, e.g. an internet protocol or a frame relay protocol.

In one embodiment, an IuB interface refers to an interface used to link the RNC with base stations.

In one embodiment, an IuR interface refers to an interface that links two RNCs.

In one embodiment, an IuCS-interface refers to an interface between the RNC and the MSC used in 3G networks.

In one embodiment, an IuPS-interface refers to an interface between the RNC and the SGSN used in 3G networks.

Signaling System 7 (SS7) Signaling Transport (SIGTRAN) refers to an interface on a signaling gateway that converts common channel signaling messages from SS7 to SIGTRAN protocol for transporting of signaling information over an internet protocol network.

In one embodiment, a service provider's core network may comprise one or more mobile switching centers (MSCs), one or more gateway mobile switching centers (GMSCs), one or more serving GPRS support nodes (SGSNs), one or more gateway GPRS support node (GGSNs). In order to route the calls to and from the user endpoint devices, each of the radio network controllers and base station controllers are homed to an SGSN for data calls and to an MSC for voice calls. However, the core network may contain a plurality of SGSNs to which a radio network controller or a base station may be homed. Similarly, the core network may contain a plurality of MSCs to which a radio network controller or a base station controller may be homed. For each radio network controller, a specific SGSN and a specific MSC is selected from among the plurality of SGSNs and MSCs. Similarly, for each base station controller, a specific SGSN and a specific MSC is selected from among the plurality of SGSNs and MSCs. Thus, in order to meet the needs of the users accessing services via the 2G and/or 3G networks, capacity planning of core network nodes will be beneficial.

In one embodiment, the core network nodes, e.g., the SGSNs, GGSN, MSCs and GMSCs may be communicating with user endpoint devices accessing services via a 2G or a 3G wireless network. For example, a particular network node may operate in dual mode such that user endpoint devices are able to access services via either the 2G or 3G wireless network. In another embodiment, the core network node may communicate with user endpoint devices accessing services only via a 3G wireless network. In yet another embodiment, the core network node may communicate with user endpoint devices only via a 2G wireless network. As such, the capacity planning of the core network nodes may depend on connectivity to both 2G and 3G wireless networks, connectivity to only the 3G wireless networks, or connectivity to only the 2G wireless networks.

In order to simplify the description, the capacity planning for core network nodes is described below for core network nodes with connectivity to the 3G wireless network. The method can be similarly applied for the core network nodes with connectivity to the 2G network. If the planning is for core network nodes with connectivity to both the 3G and 2G networks, the resulting capacity plan provides homing of radio network controllers and base station controllers to the core network nodes.

In order to describe a typical user interaction with the radio network controller and base stations, suppose a user initiates a call via the base station A which is controlled by the radio network controller X. Suppose the user then moves from one cell site to another cell site necessitating a hand over from the base station A to a second base station B. If the call is being handed over to a base station in another radio network controller's territory (e.g., radio network controller Y controlling base station B), the radio network controller X needs to hand over the call to the radio network controller Y. This example illustrates that if the first and the second base stations are not controlled by the same radio network controller, then the call may need to be handed over to another radio network controller. Suppose the radio network controllers X and Y are homed to different SGSNs and different MSCs in the core network. The handover of calls from one radio network controller to another radio network controller then requires extra signaling, and may incur delay. For example, if the call is a voice call, the handover would necessitate extra signaling to the MSC. In another example, if the call is a data call, the handover would necessitate extra signaling to the SGSN. The relative merit of load balancing among a plurality of radio network controllers against the resulting increase in handover traffic and signaling may then need to be evaluated. Therefore, a method for providing capacity planning for core network nodes needs that takes into account various factors, e.g., penalty factors, will be beneficial to service providers of wireless networks.

In one embodiment, the current method performs the planning of the deployment of serving general packet radio service support nodes (SGSNs) in accordance with several factors, e.g., the need to provide load balancing among the existing SGSNs, the need to minimize the handover of traffic across SGSN boundaries, the need to minimize capital cost of deploying new SGSNs, the need to minimize radio network control to SGSN re-homing, the need to minimize the number of SGSNs assigned to radio network controller groups, the need to minimize cost of backhauling (transport cost from radio network controller to the SGSN), the need to automatically incorporate key SGSN parameters computed based on actual observations, the need to account for network performance data, the need to account for user behavior data, and the like.

As illustrated by the above example, the penalties (broadly advantages and disadvantage) associated with load-balancing and handover minimization need to be carefully weighed against each other. Moreover, user considerations (e.g., user behavior data) may affect the relative weighting between load balancing and handover minimization. For example, a group of radio network controllers may be intentionally grouped together and will be better served by the same SGSN. For example, if most calls are among users communicating via a specific set of base stations homed to a specific set of radio network controllers, then homing the set of radio network controllers to the same SGSN should be beneficial. However, in another example, load balancing may be more important than homing the group of radio network controllers to the same SGSN, i.e., the traffic load can be divided among a plurality of SGSNs.

In one embodiment, the number of SGSNs assigned to groups of radio network controllers may be defined based on geographical clustering. For example, proximity to large cities, cultural venues, transportation hubs, etc. may increase connectivity among a plurality of radio network controllers. In one embodiment, various SGSN parameters computed based on actual observations may be used in market specific call models for future SGSN capacity planning.

In one embodiment, there may be constraints placed on homing requirements of the radio network controllers. For example, certain radio network controllers may be required to be homed to a given SGSN, certain radio network controllers may be required not to be homed to a given SGSN, certain groups of radio network controllers may be required to be homed to a same SGSN, certain groups of radio network controllers may be required to be homed to different SGSNs, and so on.

In one embodiment, user behavior data and preference data are used to capture the dynamic nature of user applications. For example, new applications may impose different constraints in terms of the amount of traffic the SGSN needs to handle. For instance, a new application may impose a higher throughput requirement as opposed to an older application. For example, an application that transmits image data (e.g., medical images, pictures, etc.) will likely impose a higher data throughput than an application for supporting text only emails. In one example, the users may be accessing services via 2G networks, via 3G networks, via either a 2G or 3G network. The SGSN may then need to handle different amount of traffic based on the types of wireless networks being used to access services.

In one embodiment, SGSNs at different physical locations may have different requirements. For example, an SGSN serving radio network controllers that control base stations in a large metropolitan area, may have a different requirement as compared to an SGSN serving radio network controllers in a less densely populated area.

In one embodiment, the call models for calls traversing the radio network controllers may change over time. For example, a call model may change based on season of the year, day of the week, time of day, introduction of new user device types, introduction of new applications, etc. Since the call models are dynamic, the performance of the SGSNs needs to be assessed based on the changing call models. For example, an SGSN may be adequate for homing a large number of radio network controllers near a cultural venue when the venue has limited use. However, when the venue is fully utilized, there may be additional traffic being supported by the radio network controllers near the venue, thereby potentially requiring additional radio network controllers being added near the venue, etc. Hence, additional SGSNs that support the radio network controllers may be needed. Thus, the call models and user behavior will affect the performance of the SGSNs in the network throughout the life of the SGSNs.

In one embodiment, the current method gathers network performance data to evaluate how well the SGSNs are meeting the various requirements. For example, an SGSN's performance may be measured in terms of how many simultaneously attached users [SAU] the SGSN can handle, how many data calls may be routed through the SGSN, the bi-directional throughput values, the SGSN's capacity limit, etc. The performance data for each SGSN is then obtained and analyzed to evaluate key performance parameters. The result of the analysis may then be used for SGSN planning.

In one embodiment, the SGSN planning may be used to provide efficient boundary for radio network controller homing, re-homing, or a combination of homing and re-homing. For example, the method may provide an SGSN plan, for each forecasting period, such that all business, cost and engineering constraints are met. Thus, one goal is then to minimize the overall penalty factors. In one example, radio network controllers in a 3G network may be re-homed based on a computation of capacity planning. It should be noted that the reference to the 3G network is only illustrative and should not be interpreted as a limitation of the present disclosure. In one example, the planning may be used to determine an optimal upgrade or deployment schedule for new and/or existing SGSNs.

In order to provide the planning of the SGSNs while considering all of the above penalty factors, the current method first defines an objective function that is based on one or more of the penalty factors described above.

In one embodiment, the objective function is defined based on the following penalty factors: geographical clustering, handover traffic, load balancing, radio network controller to SGSN re-homing, and budgetary limitations (e.g., cost of an SGSN and cost of a new signaling system 7 signaling transport (SS7 SIGTRAN)). In one embodiment, the objective function is expressed as:

$$\sum_{NEWSGSN \in Market} Y[NEWSGSN, t] *$$

$$(CapEx[NEWSGSN, t] + OpEx[NEWSGSN, t] +$$

$$MonthlyOpEx[NEWSGSN, t]) +$$

$$\sum_{SGSN \in Market} W\_Cost[SGSN, t] * w[SGSN, t] *$$

$$Weight\_Sigtran + \sum_{j \in ALLSGSN} PenaltyofDist *$$

$$\left( \sum_{i \in RNC} X[i, j, t] * Distance[i, j, t] \right) +$$

$$\sum_{j \in ALLSGSN} HandOver\_Traffic[j, t] * PenaltyofHO *$$

$$slider\_scale + \sum_{j \in ALLSGSN} PenaltyofLB *$$

$$\left( \left( \sum_{i \in RNC} X[i, j, t] * Data\_Load[i, t] \right) - AvgLoad \right)^2 +$$

$$\sum_{j \in ALLSGSN} \sum_{i \in RNC} \{If(X[i, j, t] - X[i, j, t-1] \neq 0) \text{ then}$$

$$1 \text{ Otherwise } 0\} * PenaltyofRH * slider\_scale$$

Equation (1)

For clarity purposes, the various terms used in the above equation (1) are described below. The optimal solution for equation (1) may be found using a linear programming method. For example, a linear programming solver may be used. The decisions associated with the optimal solution take only integer values. For example, the decisions may involve one or more of: how many new SGSNs are needed, which one of the SGSNs should be for homing each one of the radio network controllers, etc. Hence, the problem may be defined as a mixed integer programming problem. For ease of understanding, a first decision variable to represent a connection between an RNC and an SGSN, and a second decision variable to indicate if a new SGSN should be added are first defined.

The first decision variable is Variable X[RNC,SGSN,t], which is defined as a set of binary variables X that represent the connection between an RNC and an SGSN in time period t, wherein $$X[RNC, SGSN, t] = \begin{cases} 1, & \text{If } RNC \text{ connects to the } SGSN \text{ (existing or new) in time period } t \\ 0, & \text{Otherwise.} \end{cases}$$

The variables X are defined over all possible connection combinations between RNC and SGSN in time period t. For example, for a specific RNC, there is a group of n SGSNs to which the RNC can be connected. Accordingly, a group of variables X[RNC, SGSN1, t], X[RNC, SGSN2, t], . . . , X[RNC, SGSNn, t] are defined. It is important to note that one and only one variable X in this group must have a value of one (implying a connection to the specific SGSN), the rest of the variables X have a value of zero (implying no connection to the specific SGSN).

In order to ensure that an RNC is homed (connected) only to one SGSN, the current method utilizes an additional constraint:

$$\sum_{SGSN \in Market} X[RNC, SGSN, t] = 1, \forall RNC.$$

The second variable is Variable Y[NEWSGSN, t], which is defined as a set of binary variables Y that represent if a new SGSN is to be added in time period t, wherein $$Y[NEWSGSN, t] = \begin{cases} 1, & \text{if } NEWSGSN \text{ is added in time period } t. \\ 0, & \text{Otherwise.} \end{cases}$$

The variables Y are defined over all possible new SGSN locations. In order to ensure that no RNC is connected to the new SGSN unless the new SGSN is added to the market, the current method adds the following logical constraint:

$$\Sigma_{RNC} X[RNC, NEWSGSN, t] \leq Y[NEWSGSN, t]*BigM,$$
$$\forall NEWSGSN.$$

wherein, the BigM represents a large number, e.g., 10,000. If Y[NEWSGSN,t]=0, the inequality forces the summation at the left hand side to be equal to zero. This implies that no RNC can be connected to the new SGSN if the SGSN is not added to the market.

Then, the method defines terms that serve as weight factors for differentiating the relative importance of a particular penalty factor as compared to other penalty factors in the objective function. Each penalty factor then has a weight factor that differentiates the relative importance of the penalty factor as compared to other penalty factors. In one example, the penalty for re-homing may be more important than the penalty for meeting budget targets. In another example, the penalty associated with load balancing may be more important. The current method defines PenaltyofHO, PenaltyofLB, PenaltyofRH, PenaltyofDist and Weight_Sigtran to act as weights to corresponding terms in the overall objective function. PenaltyofHO is a weight for relative importance of handover penalty, PenaltyofLB is a weight for relative importance of load balancing, PenaltyofRH is a weight for relative importance of re-homing, PenaltyofDist is a weight for relative importance of geographical clustering, and Weight_Sigtran is a weight for measuring the relative importance of costs associated with using a new SS7 SIGTRAN at a given SGSN.

In one embodiment, a user may modify the weight factor associated with a penalty factor. For example, the weight factor associated with a penalty factor can be modified using a slider scale with values from "zero" to "one". For example, moving a slider scale for PenaltyofLB towards "one" gives more importance to load balancing as compared to other penalties. In one embodiment, a default value of 0.5 is assigned to a slider scale associated with any one of the above penalties.

Returning to Equation 1, a new SGSN and a new SS7 SIGTRAN are deployed if the new SGSN and the new SS7 SIGTRAN meet budgetary limitations. The current method incorporates the penalty associated with budgetary limitations in the objective function via the terms:

$$\sum_{NEWSGSN \in Market} Y[NEWSGSN, t]*(CapEx[NEWSGSN, t] +$$

$$OpEx[NEWSGSN, t] + MonthOpEx[NEWSGSN, t])$$

and $$\sum_{SGSN \in Market} W\_Cost[SGSN, t]*w[SGSN, t]*Weight\_Sigtran$$

The objective function accounts for penalty associated with handover via the term:

$$\Sigma_{SGSN \in Market} HandOver\_Traffic[SGSN, t]*Penalty-ofHO.$$

The penalty of handover, PenaltyofHO, is the penalty for one unit of handover traffic. The total handover traffic at a given SGSN is represented by HandOver_Traffic[SGSN,t]. The formula realizes the logic that if the radio network controllers i and j (RNCi and RNCj) are connected to different SGSNs, a penalty HO Traffic [SGSNi,SGSNj,t]*PenaltyofHO, is added; otherwise, there is no handover penalty. For example, a linear programming solver may be used to solve the objective function while forcing the total handover traffic to be as low as possible.

The objective function includes the penalty associated with load balancing via the term:

$$\sum_{SGSN \in Market} PenaltyofLB *$$

$$\left( \left( \sum_{RNC} X[RNC, SGSN, t] * \text{Data\_Load}[RNC, t] \right) - AvgLoad \right)^2$$

wherein, $$AvgLoad = \frac{\sum_{RNC} \text{Data\_Load}[RNC, t]}{NumberofSGSNs}$$

The objective is defined such that: the total of the differences between the traffic loading at each SGSN and the average load is as small as possible. Since the objective function is solved while minimizing $((\Sigma_{RNC \in SGSN} X[RNC,SGSN,t] *\text{Data\_Load}[RNC,t])-AvgLoad)^2$, the loading on an SGSN, $\Sigma_{RNC} X[RNC,SGSN,t]*\text{Data\_Load}[RNC,t]$, becomes as close as possible to the average data traffic loading.

The objective function includes the penalty associated with re-homing via the term:

$$\sum_{SGSN \in Market} PenaltyofRH *$$

$$\left( \sum_{RNC \in SGSN} \{ \text{If}(X[RNC, SGSN, t] - X[RNC, SGSN, t-1] \neq 0) \right.$$

$$\left. \text{then } 1 \text{ Otherwise } 0 \} \right)$$

The penalty associated with re-homing refers to a penalty term for re-homing an RNC from one SGSN to a different SGSN. As described above, X[RNC, SGSN,t] is the decision variable of connection between an RNC and an SGSN in the current time period, and X[RNC, SGSN,t−1] is the decision variable between the same pair of RNC and SGSN but in the previous time period. Thus, the formula enforces the logic that if a RNC in the current time period connects to the same SGSN that it was connected to in the previous time period, then there is no re-homing penalty. Otherwise, a re-homing penalty is applied. Including the re-homing penalty in the objective function has the effect of keeping the number of re-homings as small as possible.

The objective function includes the penalty associated with connecting a radio network controller to an SGSN which is not geographically the closest to the radio network controller via the term:

$$\sum_{SGSN \in Market} PenaltyofDist * \left( \sum_{RNC} X[RNC, SGSN, t] * Distance[RNC, SGSN, t] \right)$$

The distance between a radio network controller and the location of an SGSN is represented by Distance[RNC,SGSN, t]. The location of the SGSN is defined as the centroid of an SGSN based on the centroid of the RNCs that are connected to the SGSN. Including the penalty for connecting to an SGSN that is not geographically the closest has the effect of clustering the radio network controllers to their closest SGSN, in terms of geographical location.

The objective function of equation (1), needs to be solved subject to business, cost and engineering constraints. For example, interface ports have limits on throughput. In another example, the cost of the SGSNs has constraints. The capacity of each SGSN is clearly bounded, and so on.

In one embodiment, the equation (1) is solved via a linear programming solver by: adding a necessary number of new SGSNs; evaluating all possibilities of radio network controller assignments to the SGSNs (new and existing); and achieving an optimal solution. The optimal solution satisfies all business, cost and engineering constraints, while minimizing the objective function defined by equation (1).

The current method includes the engineering, cost and business constraints by first classifying the constraints into one or more of the following categories: user traffic constraints, interface port constraints or control plane constraints. The user traffic constraints, interface port constraints and control plane constraints are related to one or more constraints of the SGSN parameters.

In one embodiment, the current method relates the user traffic constraints for a 3G network to the constraints of the SGSN parameters: sector count, an RNC count and a subscriber count. If the SGSN is used for 2G networks, the SGSN parameter comprises the BSC count.

In one embodiment, the constraint on an RNC count parameter is defined as:

$$\sum_{RNC} X[RNC, SGSN, t] \leq RNC\_Capacity[SGSN, t] * RNC\_Count\_EngrLimit$$

In one embodiment, the current method relates the control plane constraints to the constraints of the SGSN parameters used for management of resources and mobility. In one embodiment, the parameters may have values calculated differently for different wireless networks. For example, the parameter may be based on throughput of a 2G network, throughput of a 3G network, central processing unit (CPU) utilization, etc.

In one embodiment, the control plane constraints are related to a constraint of the SGSN parameter, 3G data throughput. For example, the constraint of the SGSN parameter, 3G data throughput, may be defined as:

$$\sum_{RNC} X[RNC, SGSN, t] * 3G\_Data\_Demand[RNC, t] \leq$$

$$3G\_Data\_Capacity[SGSN, t] * Data\_EngrLimit$$

wherein 3G_data_Demand is a function of IuPS_throughput.

In one embodiment, the control plane constraints are related to a constraint of the SGSN parameter, CPU utilization. For example, the constraint of the CPU utilization may be defined as:

$$\sum_{RNC} X[RNC, SGSN, t] * CPU\_Demand[RNC, t] \leq$$

$$CPU\_Capacity[SGSN, t] * CPU\_EngrLimit$$

wherein CPU_Demand is a function of IuPS_throughput, CPU_PER_Suscriber and IEBH_SGSN_PDT_Ratio.

It should be noted that IuPS_throughput is the RNC data throughput over the IuPS interface. CPU_PER_Suscriber is the average amount of SGSN CPU usage per subscriber. IEBH_SGSN_PDT_Ratio is the ratio of sum of RNC data throughput in individual RNC busy hour to the total SGSN data throughput in SGSN busy hour. For example, if 3 RNCs are homed to a SGSN and the busy hour is 8 am for RNC1, 12 pm for RNC2, 5 pm for RNC3, and 4 pm for the SGSN, then this ratio is the sum of throughput at 8 am for RNC1, 12 pm for RNC2 and 5 pm for RNC3, divided by SGSN throughput at 4 pm.

In one embodiment, the current method relates the interface port constraints to the constraints of the SGSN parameters:
Packet data protocol (PDP) demand constraints;
IuPS OC-3 (optical carrier level 3) link constraints (for RNC);
Gb T1 (T-Carrier level 1) link constraints (for BSC);
PAPU (Packet Processing Unit) constraints; and;
SS7 link (low speed or SIGTRAN) constraints.

In one embodiment, the constraint on the SGSN parameter IuPS OC-3 link constraint is defined as:

$$\sum_{RNC} X[RNC, SGSN, t] * IuPS\_OC3\_Demand[RNC, t] \leq$$

$$IuPS\_OC3\ Capacity\_[SGSN, t] * IuPS\_ENGINEERING\ LIMIT$$

In one embodiment, the constraint on the SGSN parameter PDP demand constraint is defined as:

$$\Sigma_{RNC} X[RNC,SGSN,t] * PDP\_Demand[RNC,t] \leq PDP\_Capacity[SGSN,t] * PDP\ ENGINEERING\ LIMIT.$$

Figure 2:
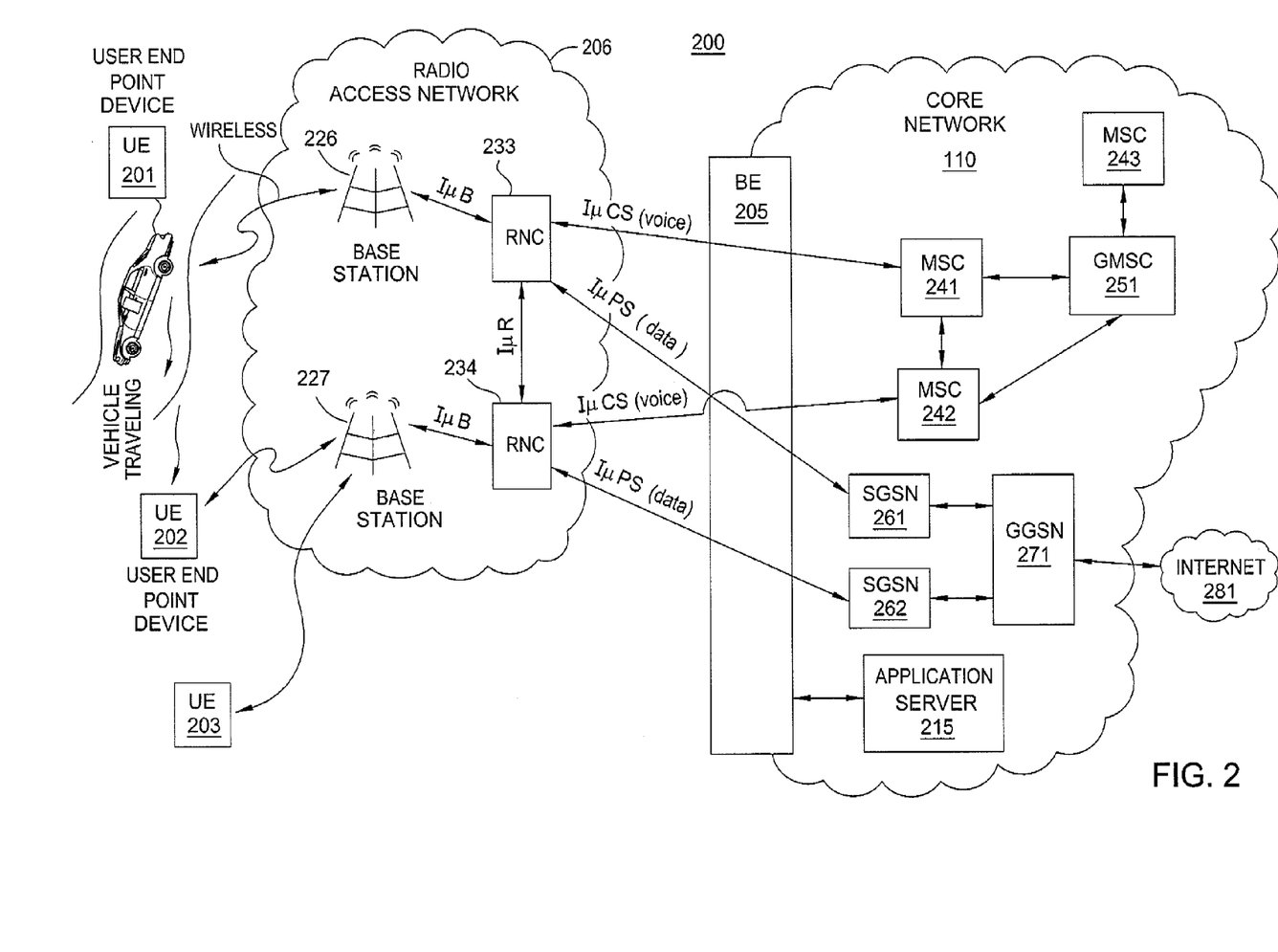
FIG. 2 provides an exemplary network with the current method of planning serving general packet radio service support nodes.

FIG. 2 provides an exemplary illustration 200 of a network with the current method of planning SGSNs. For example, the current method for planning SGSNs is implemented in an application server 215 located in the core network 110. Alternatively, the application server 215 can be deployed external to the core network. The end point devices communicate with the core network 110 via a radio access network 206 and border element (BE) 205.

In one embodiment, the core network 110 comprises mobile switching centers (MSCs) 241-243, a gateway mobile switching center (GMSC) 251, serving GPRS support nodes (SGSNs) 261 and 262, a gateway GPRS support node (GGSN) 271. The radio access network 206 comprises base stations 226 and 227 and radio network controllers 233 and 234. Base station 226 communicates with the radio network controller 233 via an IuB interface and is controlled by the radio network controller 233. Base station 227 communicates with a radio network controller 234 via an IuB interface and is controlled by the radio network controller 234. The base stations 226 and 227 communicate with one or more user endpoint devices 201-203 via a wireless interface. Communication among the plurality of radio network controllers (e.g., RNCs 233 and 234) is performed over an IuR interface. The radio network controllers 233 and 234 communicate with the MSCs 241 and 242, respectively, e.g., for routing voice calls. The interface between a respective radio network controller 233 or 234 and a respective MSC 241 or 242 is an IuCS-interface. Similarly, the radio network controllers 233 and 234 communicate with the SGSNs 261 and 262, respectively, e.g., for routing data calls. The interface between a respective radio network controller 233 or 234 and a respective SGSN 261 or 262 is an IuPS interface.

In one embodiment, the MSCs 241 and 242 are in communication with the GMSC 251. When the GMSC 251 receives a voice call from the MSC 241 or 242, the GMSC 251 determines which one of the MSCs 241-243 is being visited by a called party of the received voice call. The voice call is then forwarded to the MSC (one of the MSCs 241-243) being visited by the called party. Similarly, data calls are routed to their destination via an RNC 233 or 234, an SGSN 261 or 262 and the GGSN 271. The GGSN 271 is in communication with external networks, e.g., the internet 281. If the call is intended for a called party not serviced by the core network 110, the GGSN 271 may then forward the call to the external network.

In one embodiment, the user of the endpoint device 201 may travel from a geographical area served by the base station 226 to a geographical area served by the base station 227. As the user travels to various locations, the radio network controller 233 may have to handover an ongoing call to the radio network controller 234. The radio network controller 233 is homed to SGSN 261 and the radio network controller 234 is homed to SGSN 262. Once the handover is accomplished, the SGSN 262 handles the data traffic to and from the user endpoint device 201. It should be noted FIG. 2 only provides a simplified view of the radio access network. As such, additional base stations and radio network controllers can be deployed without changing the scope of the present disclosure.

In one embodiment, the current method provides planning of SGSNs and their respective boundaries based on one or more of the above factors such that a plurality of SGSNs may function optimally network wide. It should be noted that the present method does not require that all of the above factors be considered. The factors that will be considered will be governed by the requirements of a particular deployment.

In order to provide planning of the SGSNs, the current method calculates values for one or more SGSN parameters. The parameters may be needed for one or more of the penalty factors of the objective function. For example, a parameter may affect one or more of: penalty factor associated with geographical clustering, penalty factor associated with handover traffic, penalty factor associated with load balancing, penalty factor associated with RNC re-homing, and penalty factor associated with budgetary limitations.

In one embodiment, the input data for calculating the values for the one or more SGSN parameters may comprise one or more of:

busy hour demand forecast;
transport cost (backhauling to an SGSN);
SGSN locations;
handover data;
unit cost for new SGSNs and the time required to deploy new SGSNs;
unit cost for new SS7 SIGTRAN at an SGSN and the time required to deploy new SS7 SISGTRAN;
unit cost for re-homing and time required for re-homing;
unit cost for software upgrade and time required for software upgrade;
user preference to allow or disallow a new SGSN, re-homing of radio network controllers and/or software upgrade; and
user preference to control quantity and time of new SGSNs, re-homing of radio network controllers and/or software upgrade.

In one embodiment, the method may then analyze the results to determine if limits for any of the one or more SGSN parameters are exceeded. If the limits are exceeded, the method then proceeds to identify an optimal output. In one embodiment, if limits are not reached or exceeded, re-optimizing may still be performed to provide an improvement. In one embodiment, if the limits are not reached, the method for the optimization may simply be delayed until new data is gathered.

In one embodiment, the current method provides an optimal output that may comprise: adding one or more new SGSNs, providing load balancing among existing SGSNs, minimizing handover traffic, and performing upgrades on existing SGSNs. The optimal output is derived by finding the optimal solution for the objective function of Equation 1.

In one embodiment, the current method provides one or more of the following schedules or reports based on the above optimal output:

a time series for SGSN additions;
a time series for SGSN upgrades;
a time series for radio network controller re-homing and/or load balancing;
a time series for radio network controller to an SGSN assignment; and
a report for triggering radio access network or core network activities.

It is important to note that the above optimal output may be determined in conjunction with other methods that add radio network controllers (or base station controllers). For example, if there is more demand, one or more RNCs and base stations may need to be added in order to handle the connectivity to the user endpoint devices. Hence, the base stations and RNCs may be added in the process of determining an optimal output for planning of SGSNs.

Figure 3:
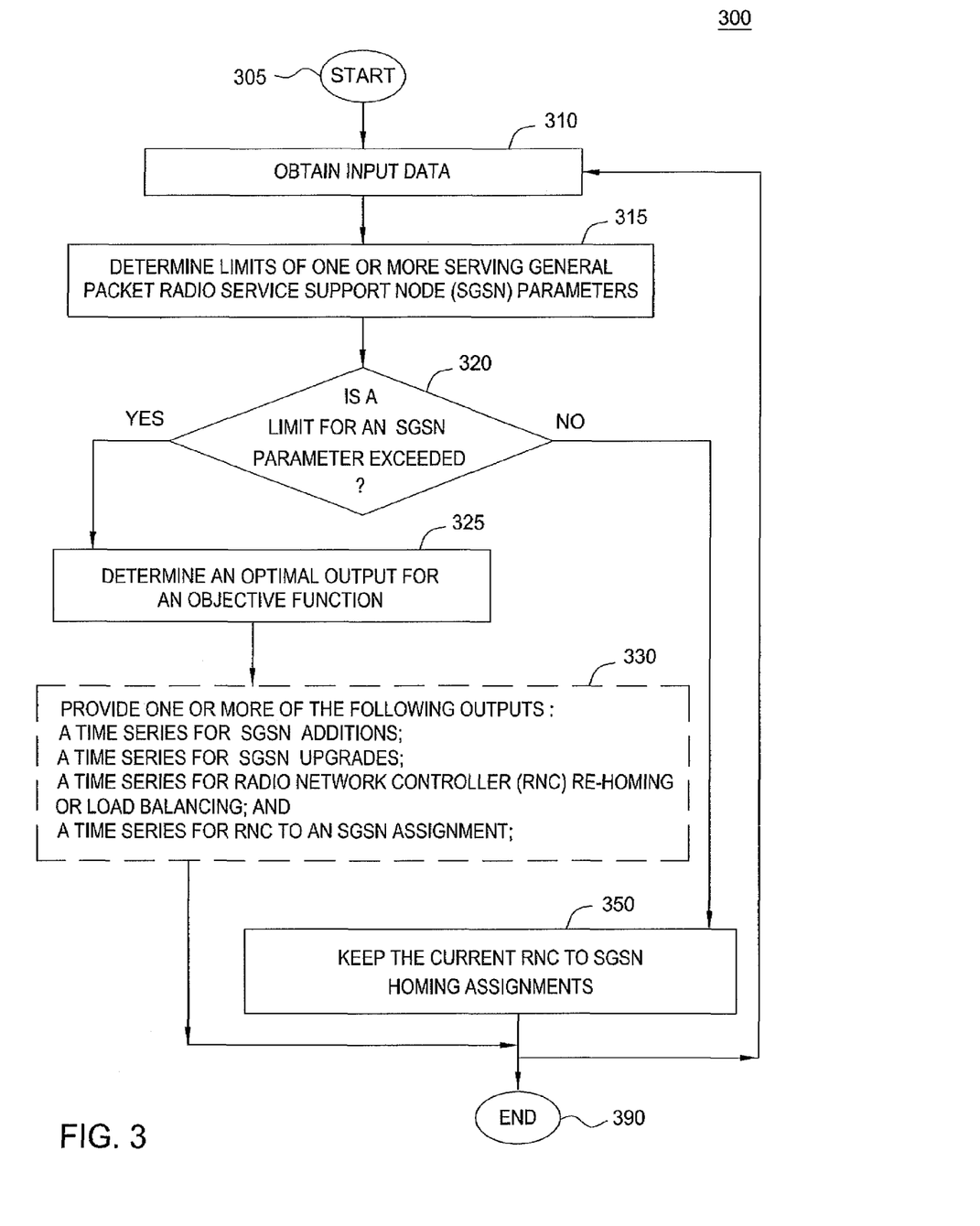
FIG. 3 illustrates a flowchart of the method for planning serving general packet radio service support nodes in a wireless network.

FIG. 3 illustrates a flowchart of a method 300 for planning SGSNs in a wireless network, e.g., a 3G network. The method 300 may be implemented in an application server (or a general purpose computer as disclosed in FIG. 4 below) located in the service provider's network. For example, the method is implemented in the application server 215 deployed in the core network 110. Method 300 starts in step 305 and proceeds to step 310.

In step 310, method 300 obtains input data for determining values of one or more SGSN parameters. The input data may comprise one or more of:

busy hour demand forecast;
transport cost (backhauling to an SGSN);
SGSN locations;
handover data;

unit cost for new SGSNs and the time required to deploy new SGSNs;
unit cost for new SS7 SIGTRAN at an SGSN and the time required to deploy new SS7 SISGTRAN;
unit cost for re-homing and time required for re-homing;
unit cost for software upgrade and time required for software upgrade;
user preference to allow or disallow a new SGSN, re-homing of radio network controllers and/or software upgrade; and
user preference to control quantity and timing of new SGSNs, re-homing of radio network controllers and/or software upgrade.

In step 315, method 300 determines the values (broadly limits) of the one or more SGSN parameters. For example, the method may determine data throughput for each SGSN, performance data for each SGSN, backhauling cost for each SGSN, etc.

In optional step 320, method 300 determines if a limit for an SGSN parameter is exceeded. For example, throughput limits, may be reached for one or more SGSNs. In another example, the performance of one or more SGSNs may be degraded. In one embodiment, if at least one limit is exceeded, the method proceeds to step 325. However, it should be noted that method 300 can be triggered even if no limit has been exceeded. For example, the method 300 can be triggered manually if there is a need or a desire to perform a re-optimization analysis. Otherwise, the method proceeds to step 350, or alternatively to step 325 to re-optimize the radio network controller to SGSN connectivity.

In step 325, method 300 determines an optimal output for an objective function, wherein the objective function is based on one or more penalty factors. For example, the objective function may be defined based on one or more of the following penalty factors: geographical clustering, handover traffic, load balancing, radio network controller re-homing and one or more budgetary limitations. The optimal output is then the output that minimizes the penalty over all the penalty factors. That is, the optimal output minimizes the objective function provided in Equation (1).

In one embodiment, the current method provides an optimal output that may comprise: adding new SGSNs, providing load balancing among existing SGSNs, minimizing handover traffic, and performing upgrades on existing SGSNs. The method then proceeds to an optional step 330.

In optional step 330, method 300 provides one or more of the following outputs based on the above optimal output:
a time series for SGSN additions;
a time series for SGSN upgrades;
a time series for radio network controller re-homing and/or load balancing; and/or
a time series for radio network controller to an SGSN assignment.

The method then either proceeds to step 390 to end processing the current planning data, or to return to step 310 to receive more input data.

In step 350, method 300 keeps the current radio network controller to SGSN homing assignments. The method then either proceeds to step 390 to end processing the current planning data, or to return to step 310 to receive more input data.

In one embodiment, the above optimal output is determined by minimizing the objective function provided in Equation (1), while considering all of the above constraints simultaneously or individually (if so desired).

In one embodiment, the above optimal output is determined by minimizing the objective function provided in Equation (1) via a multistep-wise approach. For example, the method may first determine a specific number of SGSNs needed in order to satisfy: all the capacity requirements and homing assignments of RNCs, and business rules of a market. The method then proceeds to determine the optimal solution for the resulting specific number of SGSNs.

For instance, there may be service provider or user preferences that disallow a certain group of RNCs from being homed to a same SGSN. Similarly, other groups of RNCs may be required to be homed to a same SGSN. The first step may then be to determine the number of SGSNs, using the capacity requirements and the rules that apply to a specific market. The number of new SGSNs may then be determined by subtracting the number of SGSNs already implemented from the number of SGSNs needed for the specific market. The average loading of the SGSNs may then be determined from the number of SGSNs and the total demand for the specific market. Once the average loading of the SGSNs is known, the method determines the optimal output by minimizing the objection function provided in Equation (1), while considering penalties associated with load balancing, a number of handover, a number of re-homing, geographical clustering, and all cost (including SGSN and SS7 SIGTRAN costs), engineering and business constraints. The multistep approach enables the linear programming solver to perform the search for the optimal solution without necessarily having to perform an exhaustive search that calculates the penalty for every possible homing assignment of each RNC to every possible SGSN.

It should be noted that the above multistep-wise approach may comprise any number of steps. For example, the service provider may further limit based on geographical clustering prior to determining the optimal output of Equation (1). For example, if the service provider is able to eliminate some homing assignments due to geographical clustering, the optimal output may be determined only from among the allowed homing assignments.

It should also be noted that capacity planning of the SGSNs may depend on connectivity to both 2G and 3G wireless networks, connectivity to only the 3G wireless networks, or connectivity to only the 2G wireless networks. As such, the optimal output may comprise: adding new SGSNs, providing load balancing among existing SGSNs, minimizing handover traffic, and performing upgrades on existing SGSNs. For example, the method may also provide one or more of the following outputs based on the optimal output:
a time series for SGSN additions;
a time series for SGSN upgrades;
a time series for radio network controller re-homing and/or load balancing;
a time series for base station controller re-homing and/or load balancing;
a time series for radio network controller to an SGSN assignment; and/or
a time series for base station controller to an SGSN assignment.

It should be noted that although not specifically stated, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
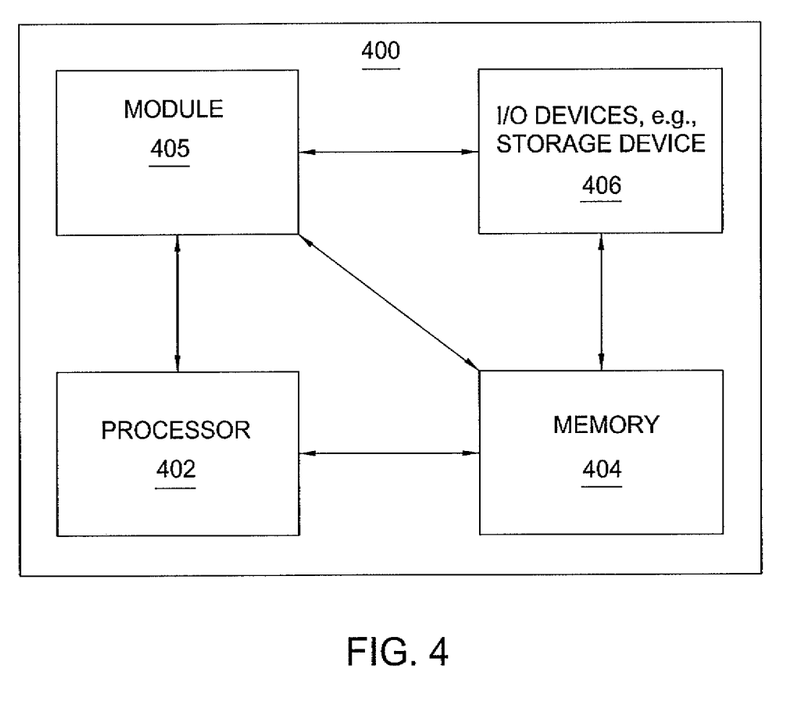
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing planning of a plurality of serving general packet radio service support node in a wireless network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 405 for providing planning of a plurality of serving general packet radio service support node in a wireless network, can be loaded into memory 404 and executed by processor 402 to implement the functions as discussed above. As such, the present method 405 providing planning of a plurality of serving general packet radio service support node in a wireless network (including associated data structures) of the present disclosure can be stored on a non-transitory (e.g., tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing planning of a plurality of serving general packet radio service support nodes in a wireless network, comprising:
   obtaining, via a processor, input data;
   determining, via the processor, a limit for a serving general packet radio service support node parameter in accordance with the input data, wherein the limit comprises a throughput limit;
   determining, via the processor, when the limit for the serving general packet radio service support node parameter is exceeded; and
   determining, via the processor, an optimal output for an objective function, wherein the objective function is based on a plurality of penalty factors, when the limit for the serving general packet radio service support node parameter is exceeded, wherein the optimal output is used for the planning of the plurality of serving general packet radio service support nodes, wherein the plurality of penalty factors comprises at least two of: a penalty factor associated with geographical clustering, a penalty factor associated with handover traffic, a penalty factor associated with load balancing, a penalty factor associated with radio network controller re-homing, and a penalty factor associated with a budgetary limitation.

2. The method of claim 1, wherein the planning comprises:
   providing a schedule based on the optimal output, wherein the schedule comprises a time series for serving general packet radio service support node additions.

3. The method of claim 1, wherein the planning comprises:
   providing a schedule based on the optimal output, wherein the schedule comprises a time series for serving general packet radio service support node upgrades.

4. The method of claim 1, wherein the planning comprises:
   providing a schedule based on the optimal output, wherein the schedule comprises a time series for radio network controller re-homing and load balancing.

5. The method of claim 1, wherein the planning comprises:
   providing a schedule based on the optimal output, wherein the schedule comprises a time series for radio network controller to a serving general packet radio service support node assignment.

6. The method of claim 1, wherein each penalty factor of the plurality of penalty factors has a weight factor that differentiates a relative importance of each penalty factor as compared to other penalty factors of the plurality of penalty factors.

7. The method of claim 6, wherein the weight factor is modified by a user.

8. The method of claim 6, wherein the weight factor is modified using a slider scale.

9. The method of claim 8, wherein the slider scale has a value set between a value of zero and a value of one.

10. The method of claim 8, wherein the slider scale has a default value.

11. The method of claim 1, wherein the input data comprises a busy hour demand forecast.

12. The method of claim 1, wherein the input data comprises a user preference.

13. A non-transitory computer-readable medium storing a plurality of instructions which, when executed by a processor, cause the processor to perform operations for providing planning of a plurality of serving general packet radio service support nodes in a wireless network, the operations comprising:
   obtaining input data;
   determining a limit for a serving general packet radio service support node parameter in accordance with the input data, wherein the limit comprises a throughput limit;
   determining when the limit for the serving general packet radio service support node parameter is exceeded; and
   determining an optimal output for an objective function, wherein the objective function is based on a plurality of penalty factors, when the limit for the serving general packet radio service support node parameter is exceeded, wherein the optimal output is used for the planning of the plurality of serving general packet radio service support nodes, wherein the plurality of penalty factors comprises at least two of: a penalty factor associated with geographical clustering, a penalty factor associated with handover traffic, a penalty factor associated with load balancing, a penalty factor associated with radio network controller re-homing, and a penalty factor associated with a budgetary limitation.

14. An apparatus for providing planning of a plurality of serving general packet radio service support nodes in a wireless network, comprising:
   a processor; and
   a computer readable medium storing a plurality of instructions which, when executed by the processor, cause the processor to perform operations, the operations comprising:

obtaining input data;

determining a limit for a serving general packet radio service support node parameter in accordance with the input data, wherein the limit comprises a throughput limit;

determining when the limit for the serving general packet radio service support node parameter is exceeded; and determining an optimal output for an objective function, wherein the objective function is based on a plurality of penalty factors, when the limit for the serving general packet radio service support node parameter is exceeded, wherein the optimal output is used for the planning of the plurality of serving general packet radio service support nodes, wherein the plurality of penalty factors comprises at least two of: a penalty factor associated with geographical clustering, a penalty factor associated with handover traffic, a penalty factor associated with load balancing, a penalty factor associated with radio network controller re-homing, and a penalty factor associated with a budgetary limitation.

* * * * *